United States Patent
Ishikawa et al.

(10) Patent No.: US 6,979,277 B2
(45) Date of Patent: Dec. 27, 2005

(54) TOROIDAL-TYPE CONTINUOUSLY VARIABLE TRANSMISSION

(75) Inventors: Kouji Ishikawa, Kanagawa (JP); Takashi Imanishi, Kanagawa (JP)

(73) Assignee: NSK Ltd., Tokyo (JP)

( * ) Notice: Subject to any disclaimer, the term of this patent is extended or adjusted under 35 U.S.C. 154(b) by 294 days.

(21) Appl. No.: 10/407,246

(22) Filed: Apr. 7, 2003

(65) Prior Publication Data
US 2003/0190994 A1 Oct. 9, 2003

(30) Foreign Application Priority Data
Apr. 8, 2002 (JP) .............................. 2002-105354

(51) Int. Cl.[7] .............................................. F16H 57/04
(52) U.S. Cl. .............................. 476/8; 476/40; 476/46
(58) Field of Search ............................. 476/40, 42, 46, 476/8

(56) References Cited

U.S. PATENT DOCUMENTS

| | | | |
|---|---|---|---|
| 5,099,710 A | | 3/1992 | Nakano |
| 6,612,962 B2 * | | 9/2003 | Mori ............................ 476/46 |
| 6,616,568 B2 * | | 9/2003 | Ooyama ....................... 476/40 |
| 2001/0016535 A1 * | | 8/2001 | Itoh et al. ...................... 476/46 |
| 2002/0039948 A1 * | | 4/2002 | Ooyama ....................... 476/40 |
| 2002/0111247 A1 * | | 8/2002 | Mori et al. ..................... 476/46 |
| 2002/0137593 A1 * | | 9/2002 | Mori et al. ..................... 476/46 |
| 2002/0187876 A1 * | | 12/2002 | Imanishi ......................... 476/8 |
| 2003/0195081 A1 * | | 10/2003 | Machida et al. ............... 476/40 |
| 2004/0087412 A1 * | | 5/2004 | Mori et al. .................... 476/46 |

FOREIGN PATENT DOCUMENTS

| | | |
|---|---|---|
| JP | 62-71465 | 5/1987 |
| JP | 62-156658 | 10/1987 |
| JP | 2-163567 | 6/1990 |
| JP | 8-291850 | 11/1996 |
| JP | 11-247954 | 9/1999 |
| JP | 11-325211 | 11/1999 |
| JP | 2001-32899 | 2/2001 |
| JP | 2001-124164 | 5/2001 |

* cited by examiner

Primary Examiner—David Fenstermacher
(74) Attorney, Agent, or Firm—Sughrue Mion, PLLC

(57) ABSTRACT

A toroidal-type continuously variable transmission, includes: a trunnion including: a support plate portion; and a pair of bent wall portions formed in longitudinal-direction two end portions of the support plate portion and bent on an inner surface side of the support plate portion, the pivot shafts being disposed concentrically with each other on outer surfaces of the bent wall portions; a trunnion shaft formed integrally with the pivot shaft; an oil pressure piston fitted with an outer peripheral surface of the trunnion shaft for moving the trunnions along the axial direction of the pivot shaft; and, a cut-away portion formed in the outer peripheral surface of the trunnion shaft for forming, between the cut-away portion and the oil pressure piston, an oil passage for a lubricating oil to be supplied to the bearing for a power roller.

4 Claims, 7 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission which can be used as a transmission for a vehicle or various kinds of industrial machines.

2. Description of the Related Art

As a transmission for a vehicle, use of such a toroidal-type continuously variable transmission as schematically shown in FIGS. 4 and 5 has been executed in part of the vehicle industry. In this toroidal-type continuously variable transmission, for example, as disclosed in JP-UM-A-62-71465, an input side disk 2 serving as a first disk is supported concentrically with an input shaft 1, and an output side disk 4 serving as a second disk is fixed to the end portion of an output shaft 3 which is disposed concentrically with the input shaft 1. In the interior of a casing in which the toroidal-type continuously variable transmission is stored, there are disposed trunnions 6, 6 which can be respectively swung about their associated pivot shafts 5, 5 disposed at positions twisted with respect to the input shaft 1 and output shaft 3. On the respective trunnions 6, 6, there are rotatably supported power rollers 11, while the power rollers 11, 11 are respectively held by and between the input side and output side disks 2, 4.

Each of the sections of the mutually opposed inner surfaces 2a, 4a of the input side and output side disks 2, 4 provides a concave surface which can be obtained by rotating an arc with the pivot shaft 5 as a center thereof or a curved line resembling this arc. And, the peripheral surfaces 11a, 11a, which are respectively formed as spherically convex surfaces, of the power rollers 11, 11 are contacted with the inner surfaces 2a, 4a.

Between the input shaft 1 and input side disk 2, there is interposed a pressing device 12 of a loading cam type. The pressing device 12 presses the input side disk 2 toward the output side disk 4 elastically. Also, the pressing device 12 includes a cam plate 13 rotatable together with the input shaft 1 and a plurality of (for example, four) rollers 15, 15 held in a retainer 14. Also, on one side surface (in FIGS. 4 and 5, the left side surface) of the cam plate 13, there is formed a cam surface 16 being a curved surface extending in the peripheral direction of the cam plate 13; and, on the outer surface (in FIGS. 4 and 5, the right side surface) of the input side disk 2 as well, there is formed a similar cam surface 17. And, the plurality of rollers 15, 15 are supported in such a manner that they can be rotated about their respective shafts extending in the radial direction with respect to the input shaft 1.

In the thus-structured toroidal-type continuously variable transmission, in case where the input shaft 1 is rotated, the cam plate 13 is rotated with the rotation of the input shaft 1 and the cam surface 16 presses the plurality of rollers 15, 15 against the cam surface 17 formed on the outer surface of the input side disk 2. As a result of this, at the same time when the input side disk 2 is pressed against the plurality of power rollers 11, 11, the input side disk 2 is rotated due to the mutual pressing actions between the pair of cam surfaces 16, 17 and the rolling surfaces of the plurality of rollers 15, 15. And, the rotation of the input side disk 2 is transmitted through the power rollers 11, 11 to the output side disk 4, so that the output shaft 3 fixed to the output side disk 4 is rotated.

Now, description will be given below of a case where the rotation speed between the input shaft 1 and output shaft 3 is to be changed. Firstly, to reduce the rotation speed between the input shaft 1 and output shaft 3, the trunnions 6, 6 are swung about the pivot shafts 5, 5 to incline displacement shafts 9, 9 so that the peripheral surfaces 11a, 11a of the power rollers 11, 11, as shown in FIG. 4, can be respectively contacted with the near-to-center portion of the inner surface 2a of the input side disk 2 and the near-to-outer-periphery portion of the inner surface 4a of the output side disk 4.

On the other hand, to increase the rotation speed between the input shaft 1 and output shaft 3, the trunnions 6, 6 are swung about the pivot shafts 5, 5 to incline the displacement shafts 9, 9 so that the peripheral surfaces 11a, 11a of the power rollers 11, 11, as shown in FIG. 5, can be respectively contacted with the near-to-outer-periphery portion of the inner surface 2a of the input side disk 2 and the near-to-center portion of the inner surface 4a of the output side disk 4. And, in case where the inclination angles of the displacement shafts 9, 9 are set intermediate between FIGS. 4 and 5, there can be obtained an intermediate speed ratio between the input shaft 1 and output shaft 3.

Further, FIGS. 6 and 7 show a conventionally known toroidal-type continuously variable transmission. In this conventional toroidal-type continuously variable transmission, an input side disk 2 and an output side disk 4 are respectively supported on the periphery of a circular-pipe-shaped input shaft 18 through needle roller bearings 19, 19 in such a manner that they can be rotated and can be shifted in the axial direction thereof. Also, a cam plate 13 constituting a pressing device 12 of a loading cam type is spline engaged with the outer peripheral surface of the end portion (in FIG. 6, the left end portion) of the input shaft 18 and is prevented from moving in a direction to part away from the input side disk 2 by a flange portion 20. Also, an output gear 21 is connected to the output side disk 4 by keys 22, 22, so that the output side disk 4 and output gear 21 can be rotated in synchronization with each other.

Similarly to the structure shown in FIGS. 4 and 5, in the interior of a casing in which the toroidal-type continuously variable transmission is stored, there are disposed a pair of trunnions 6, 6 which can be respectively swung about their associated pivot shafts (inclined shafts) 5, 5 disposed at positions twisted with respect to the input shaft 18. Each of the trunnions 6, 6, as shown in FIG. 7 (in FIG. 7, only one trunnion is shown. Therefore, in FIG. 7, composing elements accompanying the trunnion (not shown) are not shown either.) includes a pair of bent wall portions 8, 8 which are formed on the both ends in the longitudinal-direction (in FIG. 7, the right and left direction) of a support plate portion 7 in such a manner that they are bent on the inner surface side (in FIG. 7, the lower side) of the support plate portion 7. And, due to the bent wall portions 8, 8, in the trunnion 6, there is formed a recess-shaped pocket portion P for storing a power roller 11 therein. Also, on the outer surfaces (the opposite surfaces to the support plate portion 7) of the respective bent wall portions 8, 8, there are disposed pivot shafts 5, 5 in such a manner that they are concentric with each other.

In the central portion of the support plate portion 7, there is formed a circular hole 10, while the base end portion 9a of a displacement shaft 9 is supported in the circular hole 10. And, in case where the trunnions 6, 6 are swung about the pivot shafts 5, 5, the inclination angles of the displacement shafts 9 respectively supported on the central portions of the trunnions 6, 6 can be adjusted. Also, on the peripheries of the leading end portions 9b of the displacement shafts 9 which project from the inner surfaces of the trunnions 6, 6, there are rotatably supported the power rollers 11; and, the power rollers 11, 11 are respectively held by and between the input side and output side disks 2, 4. By the way, the base end portions 9a and leading end portions 9b of the displacement shafts 9, 9 are eccentric to each other.

As shown in FIG. 7, the two end portions of each of the pair of trunnions 6, 6 are supported in such a manner that they can be swung and shifted in the axial direction (in FIG. 6, the front and back direction; and, in FIG. 7, the right and left direction) with respect to a pair of support plates 23, 23. And, as described before, in the circular hole 10 formed in the central portion of each of the support plate portions 7 constituting the trunnions 6, 6, there is rotatably supported the base end portion 9a of the displacement shaft 9 structured such that the base end portions 9a and leading end portions 9b thereof are parallel to and eccentric to each other. Also, on the leading end portion 9b of each of the displacement shafts 9 projecting from the inner surface of each of the support plate portions 7, there is rotatably supported the power roller 11.

By the way, a pair of displacement shafts 9, 9 provided in each of the pair of trunnions 6, 6 are disposed on the mutually 180° opposite positions with respect to the input shaft 18. Also, while the leading end portion 9b of each of the displacement shafts 9, 9 is eccentric to the base end portion 9a thereof, the eccentric direction of the leading end portion 9b to the base end portion 9a is the same direction (in FIG. 7, the reversed right and left direction) with respect to the rotation direction of the input side and output side disks 2, 4. Also, the eccentric direction is a direction substantially perpendicular to the arrangement direction of the input shaft 18. Therefore, the power rollers 11, 11 are supported in such a manner that they can be slightly shifted in the longitudinal direction of the input shaft 18. As a result of this, even when the power rollers 11, 11 tend to shift in the axial direction of the input shaft 18 due to the elastic deformation of the respective composing parts caused by thrust loads generated by the pressing device 12, the shifting movements of the power rollers can be absorbed without applying unreasonable forces to the composing parts.

Also, between the outer surfaces of the power rollers 11, 11 and the inner surface of the support plate portion 7 constituting the trunnions 6, 6, there are interposed a thrust ball bearing 24, which is a thrust rolling bearing, and a thrust needle roller bearing 25 in the order starting from the outer surface of the power roller 11. Each thrust ball bearing 24, while supporting a thrust-direction load applied to its associated power roller 11, allows the power roller 11 to rotate. Each thrust ball bearing 24 includes a plurality of balls 26, 26, a circular-ring-shaped retainer 27 for holding the balls 26, 26 in a rollable manner, and a circular-ring-shaped outer race 28. Also, the inner race raceway of each thrust ball bearing 24 is formed in the outer surface of its associated power roller 11, whereas the outer race raceway thereof is formed in the inner surface of its associated outer race 28.

Also, each of the thrust needle roller bearings 25 is held by and between the inner surface of the support plate portion 7 constituting its associated trunnion 6 and the outer surface of its associated outer race 28. Each thrust needle roller bearing 25, while supporting a thrust load applied to its associated outer race 28 from its associated power roller 11, allows the power roller 11 and outer race 28 to be swung and shifted about the base end portion 9a of its associated displacement shaft 9.

Further, on one end portion (in Fig. the right end portion) of each of the trunnions 6, 6, there is disposed a drive rod 29; and, on the outer peripheral surface of the middle portion of each drive rod 29, there is fixedly disposed a drive piston 30 (an oil pressure piston). And, these drive pistons 30 are respectively fitted and mounted into their associated drive cylinders 31 in an oil-tight manner.

In the case of the thus-structured toroidal-type continuously variable transmission, the rotation power of the input shaft 18 is transmitted through the pressing device 12 to the input side disk 2. And, the rotation power of the input side disk 2 is transmitted through the pair of power rollers 11, 11 to the output side disk 4 and further the rotation power of the output side disk 4 is taken out by the output gear 21.

To change the rotation ratio between the input shaft 18 and output gear 21, the pair of drive pistons 30, 30 may be shifted in the mutually opposite directions. The pair of trunnions 6, 6 are shifted in the mutually opposite directions in accordance with the shifting of the two drive pistons 30, 30. For example, the power roller 11 (not shown) situated on the lower side in FIG. 7 is shifted to the right, while the power roller 11 of FIG. 7 situated on the upper side is shifted to the left. This changes the direction of a tangential-direction force acting on the contact portions between the peripheral surfaces 11a, 11a of the power rollers 11, 11 and the inner surfaces 2a, 4a of the input side and output side disks 2 and 4. And, as the direction of this force is changed, the trunnions 6, 6 are respectively swung in the mutually opposite directions about their associated pivot shafts 5, 5 that are pivotally supported on the support plates 23, 23.

As a result of this, as shown in the above-mentioned FIGS. 4 and 5, the contact positions between the peripheral surfaces 11a, 11a of the power rollers 11, 11 and the inner surfaces 2a, 4a of the input side and output side disks 2 and 4 are changed, so that the rotation ratio between the input shaft 18 and output gear 21 is changed. Also, in a case where a torque to be transmitted between the input shaft 18 and output gear 21 is varied and the elastic deformation amounts of the composing parts are thereby varied, the power rollers 11, 11 and outer races 28 associated with these power rollers 11 are slightly rotated about the base end portions 9a of their associated displacement shafts 9, respectively. Between the outer surfaces of the outer races 28 and the inner surfaces of the support plate portions 7 constituting the trunnions 6, there are interposed the thrust needle roller bearings 25 and, therefore, the above rotational movements of the power rollers and outer races are executed smoothly. Accordingly, as described before, there is required only a small force to change the inclination angles of the displacement shafts 9, 9.

As described before, in the toroidal-type continuously variable transmission, by applying a pressure difference to an oil pressure piston 30 fixedly disposed on a drive rod (which is hereinafter referred to as a trunnion shaft) 29 extending from one end of the pivot shaft 5 of the trunnion 6, the trunnion 6 can be moved along the inclined rotation axis direction thereof. In this case, the oil pressure piston 30 is disposed on each of the trunnions 6; however, generally, the oil pressure is controlled using the inclined rotation angle of only one trunnion 6 (the angle of swing about the pivot shaft 5 thereof) (see e.g. JP-2-163567).

Also, the oil pressure piston 30, as described before, is fitted with the outer surface of the trunnion shaft 29 in such a manner that the trunnion shaft 29 penetrate through the oil pressure piston 30. Therefore, in the case of the trunnion 6 and trunnion shaft 29, they are formed separately from each other and, after then, they are connected together by a pin.

However, in case where the case of the trunnion 6 and trunnion shaft 29 are formed separately and are then connected together by a pin in this manner, not only the number of manufacturing steps thereof increases (to thereby the manufacturing cost thereof increases) but also the assembling precision of the trunnion 6 and trunnion shaft 29 is lowered. In view of this, there is proposed a technique in which the trunnion 6 and trunnion shaft 29 are formed as an integral body.

By the way, in case where the trunnion 6 and trunnion shaft 29 are formed as an integral body, there arises a problem as to how to form lubricating oil passages to the thrust needle roller bearing 24 and thrust ball bearing 25. Especially, since the thrust ball bearing (bearing) 24 supporting the power roller 11 is rotating at a high speed under a large load, it generates large calorific value. Therefore, a sufficient quantity of lubricating oil must be supplied to the thrust ball bearing 24.

As a general method for forming the lubricating oil passages when the trunnion 6 and trunnion shaft 29 are formed as an integral body, as shown in FIG. 7, the end portion of the trunnion shaft 29 is worked using a drill to form, in the interior of the trunnion shaft 29, a long oil hole 40 having a small diameter and extending in the axial direction of the trunnion shaft 29, and further a plug 44 is press-fitted into the thus worked end portion of the trunnion shaft 29 to thereby secure an oil passage. In this case, oil flowing from the oil hole 40 flows through an oil hole 45 formed in the pivot shaft (inclined rotation shaft) 5 of the trunnion 6 into the back surface side of the trunnion 6. By the way, in FIG. 7, reference character 42 designates a plug which is press-fitted into the oil hole 45.

However, in the above lubricating oil passage forming method, there arises a problem. That is, the trunnion 6 has hardness exceeding $H_RC30$ as a whole in order to secure the strength thereof, while this hardness is also required of the trunnion shaft 29 which is formed integrally with the trunnion 6. That is, in the above lubricating oil passage forming method, it is necessary to drill a small-diameter hole in the trunnion shaft 29 having the hardness of $H_RC30$ or higher, which results in the lowered working precision. Therefore, even when the number of steps for working the trunnion 6 and trunnion shaft 29 can be reduced by working them as an integral body, the complicated drilling operation makes it impossible to reduce the manufacturing cost thereof sufficiently.

SUMMARY OF THE INVENTION

The present invention aims at eliminating the drawbacks found in the above-mentioned conventional toroidal-type continuously variable transmission. Accordingly, it is an object of the invention to provide a toroidal-type continuously variable transmission in which a trunnion and a trunnion shaft can be formed with high precision and a lubricating oil passage in the trunnion shaft can be formed simply, whereby the number of steps for working the trunnion and trunnion shaft can be reduced and thus the manufacturing cost thereof can be reduced.

To solve the above object, according to a first aspect of the invention, there is provided a toroidal-type continuously variable transmission, including:

first and second disks respectively having inner surfaces and rotatably supported to be concentric with each other in such a manner the mutual inner surfaces thereof are opposed to each other;

a trunnion swingable about the associated pivot shafts situated at positions twisted with respect to the center axes of the first and second disks, the trunnion including:

a support plate portion; and a pair of bent wall portions formed in longitudinal-direction two end portions of the support plate portion and bent on an inner surface side of the support plate portion, the pivot shafts being disposed concentrically with each other on outer surfaces of the bent wall portions;

a displacement shaft supported on a central portion of the support plate portion of the trunnion in such a manner as to project out from the inner surface of the support plate portion;

a power roller rotatably supported on a periphery of the displacement shaft;

a bearing disposed on an outer surface of the power roller for allowing the power roller to rotate while supporting a thrust-direction load applied to the power roller;

a trunnion shaft formed integrally with the pivot shaft;

an oil pressure piston fitted with an outer peripheral surface of the trunnion shaft for moving the trunnions along the axial direction of the pivot shaft; and, a cut-away portion formed in the outer peripheral surface of the trunnion shaft for forming, between the cut-away portion and the oil pressure piston, an oil passage for a lubricating oil to be supplied to the bearing.

According to the above structure, the cut-away portion, which is interposed in the oil pressure piston and is used to form an oil passage for lubricating oil to be supplied to the bearing, is formed in the outer peripheral surface of the trunnion shaft. Therefore, a lubricating oil passage in the trunnion shaft can be formed simply and can eliminate the need to drill such a long small-diameter oil passage as in the conventional structure. Also, the step of pressure inserting a plug into the trunnion shaft can also be omitted. As a result of this, the manufacturing cost can be reduced. Further, while maintaining the high strength of the trunnion shaft, the diameter of the trunnion shaft can be reduced. Since the trunnion shaft can be made thin, the pressure receiving area of the trunnion shaft can be increased without increasing the outer periphery of the piston. This makes it possible to reduce the control pressure, thereby being able to decrease the loss of the pump. Also, since the trunnion and trunnion shaft are formed as an integral body, the trunnion and trunnion shaft can be formed with high precision and the number of steps for working them can be reduced.

DETAILED DESCRIPTION OF THE PREFERRED EMBODIMENTS

Now, description will be given below of an embodiment of a toroidal-type continuously variable transmission according to the invention. By the way, the invention has features relating an embodiment for forming a trunnion and a trunnion shaft of the toroidal-type continuously variable transmission and also an embodiment for forming an oil passage in the trunnion shaft; and, the remaining portions of the structure and operation of the invention are similar to those of the previously described conventional structure. Therefore, description will be given below only of the features of the invention, while the other portions thereof are given the same designations as in FIGS. 4 to 7 and thus the detailed description thereof is omitted here.

Figure 1:
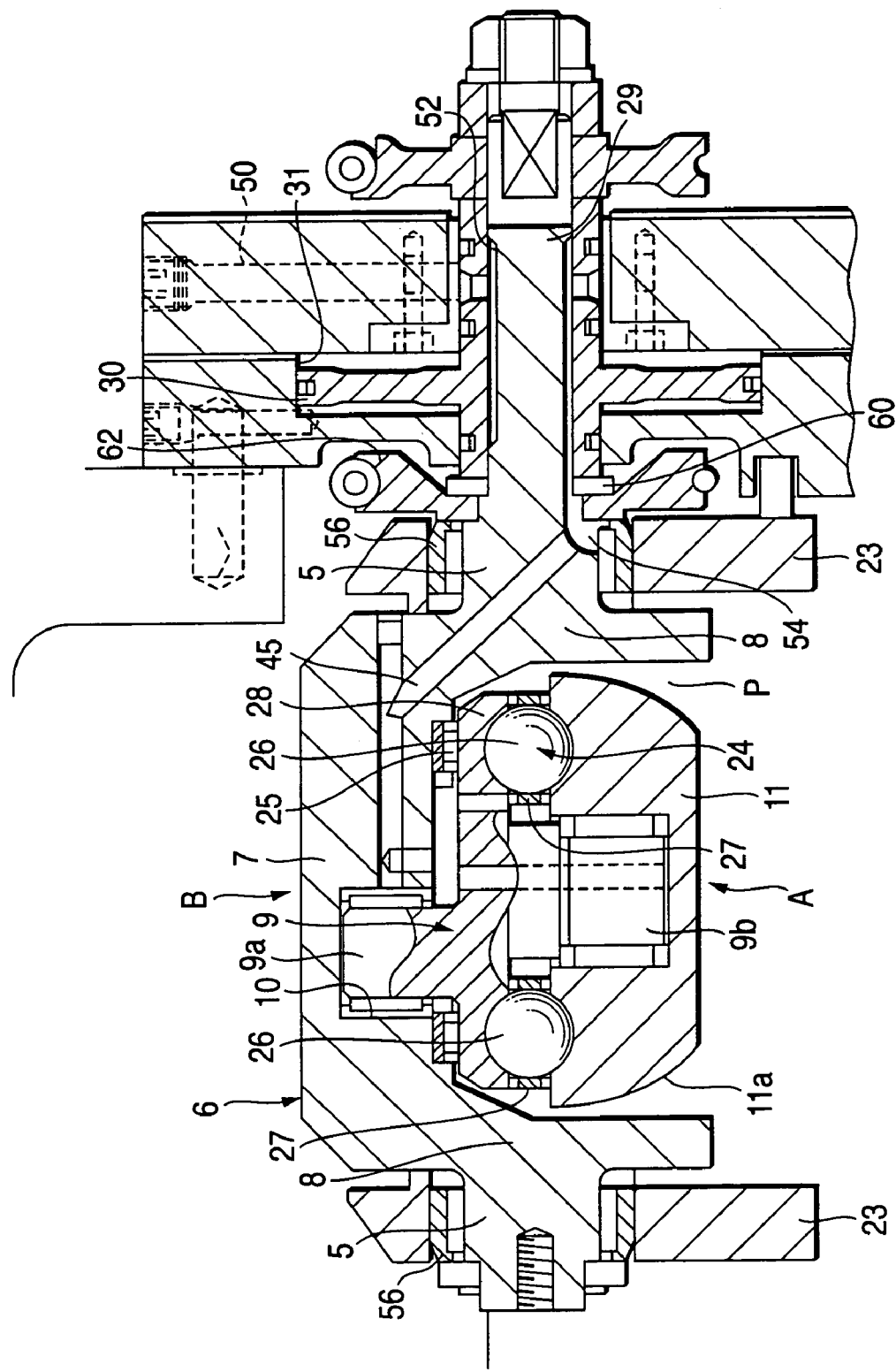
FIG. 1 is a section view of the main portions of a toroidal-type continuously variable transmission according to a first embodiment of the invention.

Now, FIGS. 1 and 2 show an embodiment of a toroidal-type continuously variable transmission according to the invention. As shown in FIGS. 1 and 2, a trunnion 6 constituting a toroidal-type continuously variable transmission according to the present embodiment, similarly to the previously described conventional structure, includes, in the longitudinal-direction (in FIG. 1, the right and left direction) two end portions of a support plate portion 7, a pair of bent wall portions 8, 8 which are formed on the inner surface side of the support plate portion 7 in such a manner that they are bent. And, on the outer surfaces of the bent wall portions 8, 8, there are disposed pivot shafts 5, 5 in such a manner that they are concentric with each other.

Figure 2A:
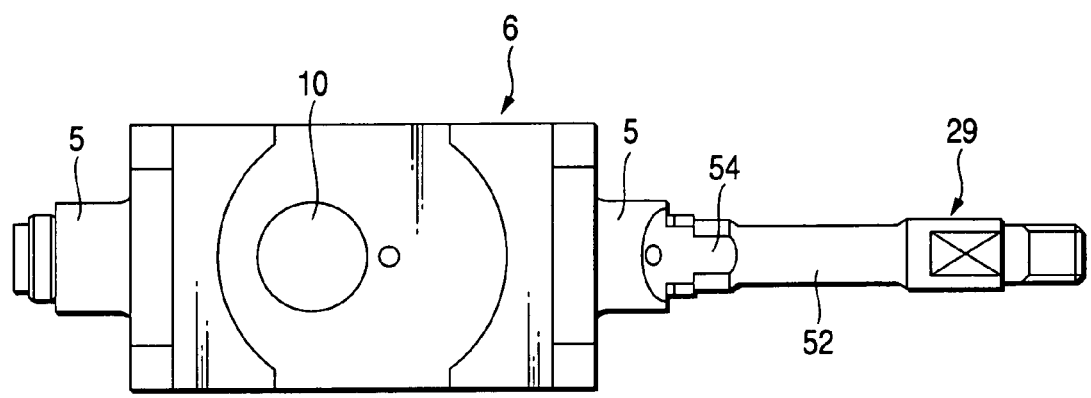
FIG. 2A is a lower surface view of a trunnion and a trunnion shaft shown in FIG. 1 (the A-direction arrow view in FIG. 1)
Figure 2B:
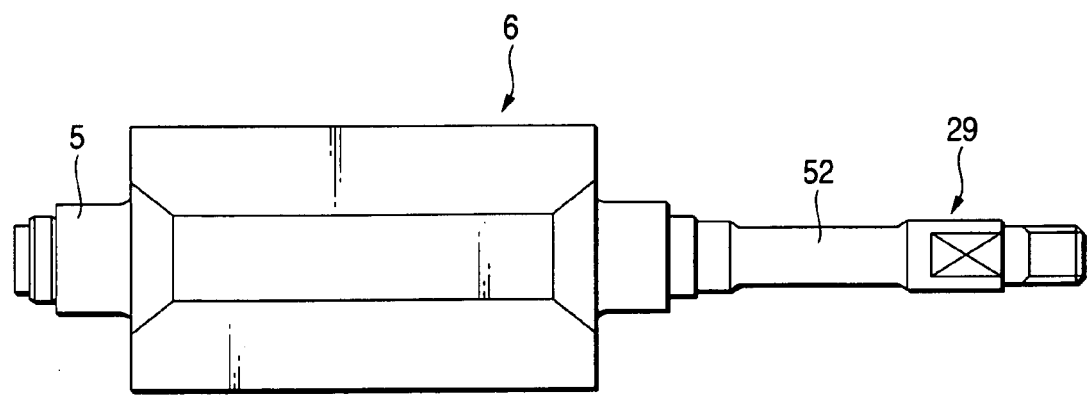
FIG. 2B is an upper surface view of the trunnion and trunnion shaft shown in FIG. 1 (the B-direction arrow view in FIG. 1)

Also, in the present embodiment, the trunnion 6 and a trunnion shaft 29 are formed as an integral body and, a flat-shaped first cut-away portion (a reduced diameter portion) 52 which forms part of a lubricating oil passage is formed in the outer peripheral surface portion of the trunnion shaft 29 with which an oil pressure piston 30 can be fitted (see FIGS. 2A and 2B). Specifically, the cut-away portion 52 partially forms a flat face in the longitudinal direction of the trunnion shaft as shown in FIG. 1 by cutting away the trunnion shaft 29 with a uniform thickness. In this case, the first cut-away portion 52, on one side, communicates with an oil hole 45 formed in the pivot shaft 5 through a deep-groove-shaped second cut-away portion 54 formed in the pivot shaft 5 portion of the trunnion 6 onto which an inclined rotation bearing 56 can be mounted and, on the other side, communicates with a lubricating oil supply passage 50 through which lubricating oil can be supplied. By the way, in the drawings, reference character 62 designates a wire pulley which can be contacted with the pivot shaft 5 of the trunnion 6, and 60 stands for a plate which is interposed between the end portion of the oil pressure piston 30 and the wire pulley 62. The second cut-away portion 54 of the pivot shaft 5 is formed to have a surface flush with a flat face of the first cut-away portion 52 (See FIG. 1).

According to the above structure, the lubricating oil, which has flown into the first cut-away portion 52 from the lubricating oil supply passage 50, flows along the axial direction of the trunnion shaft 29 the interior of a clearance between the first cut-away portion 52 and the oil pressure piston 30 as its oil passage, then flows through the second cut-away portion 54 into the oil hole 45 formed in the pivot shaft 5, and reaches the back surface side of the trunnion 6 (after then, the lubricating oil reaches the thrust needle roller bearing 24 and thrust ball bearing (bearing) 25).

By the way, in the present embodiment, the oil pressure piston 30 is tightened by a screw and the plate 60 presses the wire pulley 62, so that the wire pulley 62 can press the trunnion 6. In this case, there always exists a clearance between the wire pulley 62 and inclined rotation bearing 56. In order to be able to supply a sufficient amount of lubricating oil to the power roller 11, it is necessary to control the size of this clearance down to a small level. Preferably, the clearance may be 1 mm or less.

As has been described above, in the present embodiment, the cut-away portion 52, which is used to form an oil passage for the lubricating oil to be supplied to the thrust ball bearing 24 and the like between the oil pressure piston 30 and trunnion shaft 29, is formed in the outer peripheral surface of the trunnion shaft 29. Thanks to this, the lubricating oil passage in the trunnion shaft 29 can be formed simply, thereby being able to eliminate the need to drill such a small-diameter long oil passage in the trunnion shaft 29 as in the conventional structure. The step of pressure inserting the plug into the trunnion shaft can also be omitted. As a result of this, the manufacturing cost of the trunnion shaft can be reduced. Also, while maintaining the high strength of the trunnion shaft 29, the axial diameter of the trunnion shaft 29 can be made thin. Further, since the trunnion 6 and trunnion shaft 29 are formed as an integral body, the trunnion 6 and trunnion shaft 29 can be formed with high precision and the number of steps of working them can be reduced.

By the way, the invention is not limited to the above embodiment but, of course, various changes and modifications are also possible without departing from the gist of the invention.

Figure 3:
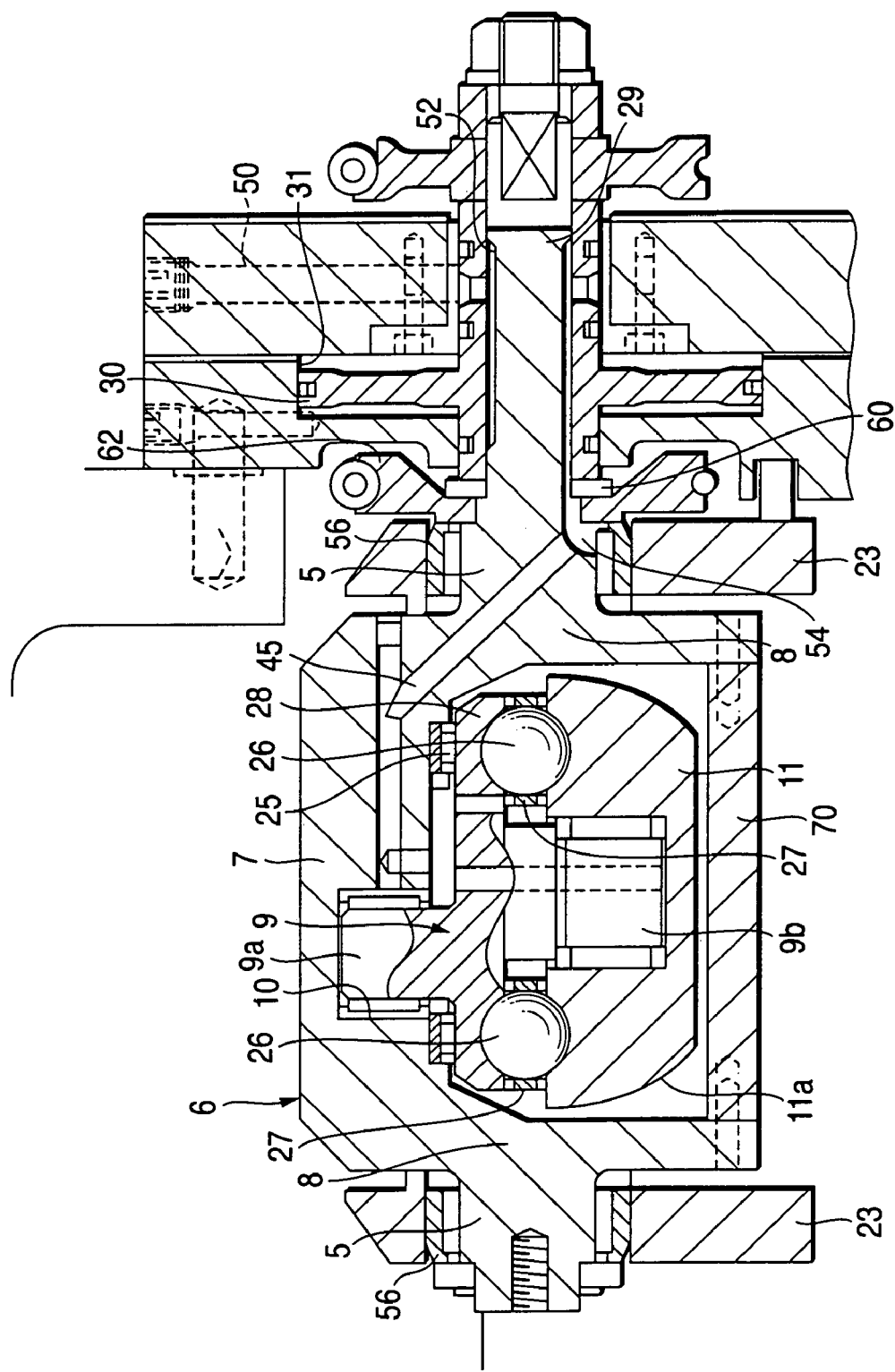
FIG. 3 is a section view of the main portions of a toroidal-type continuously variable transmission according to a modification of the first embodiment shown in FIG. 1.
Figure 4:
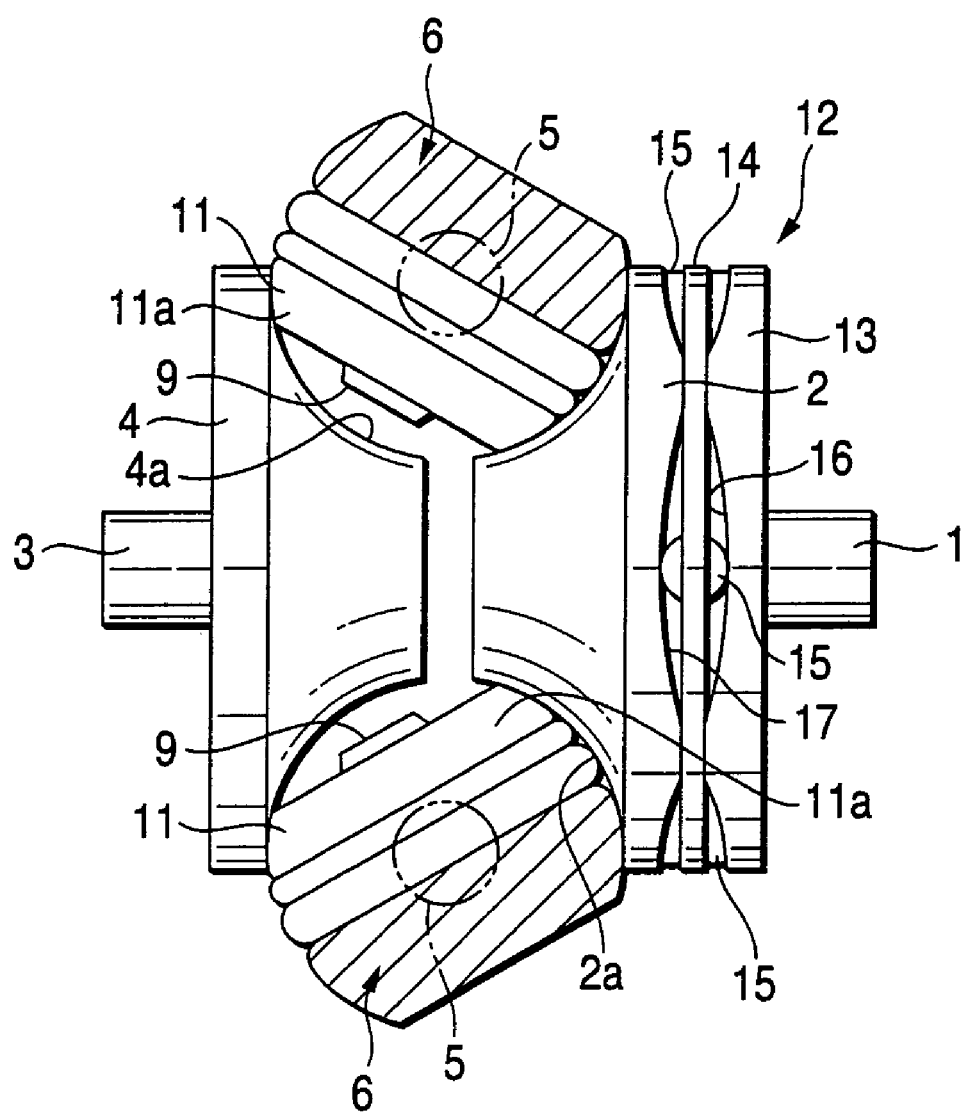
FIG. 4 is a side view of the basic structure of a conventional toroidal-type continuously variable transmission, showing the maximum speed reduced state thereof.
Figure 5:
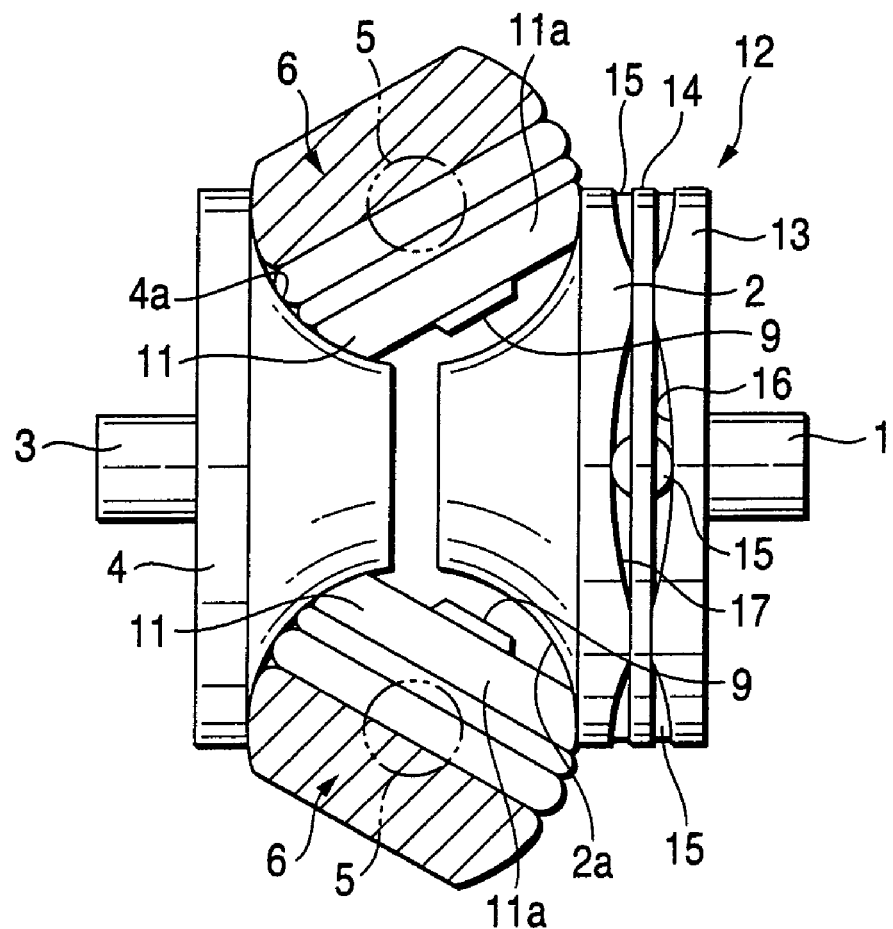
FIG. 5 is a side view of the basic structure of the conventional toroidal-type continuously variable transmission, showing the maximum speed increased state thereof.
Figure 6:
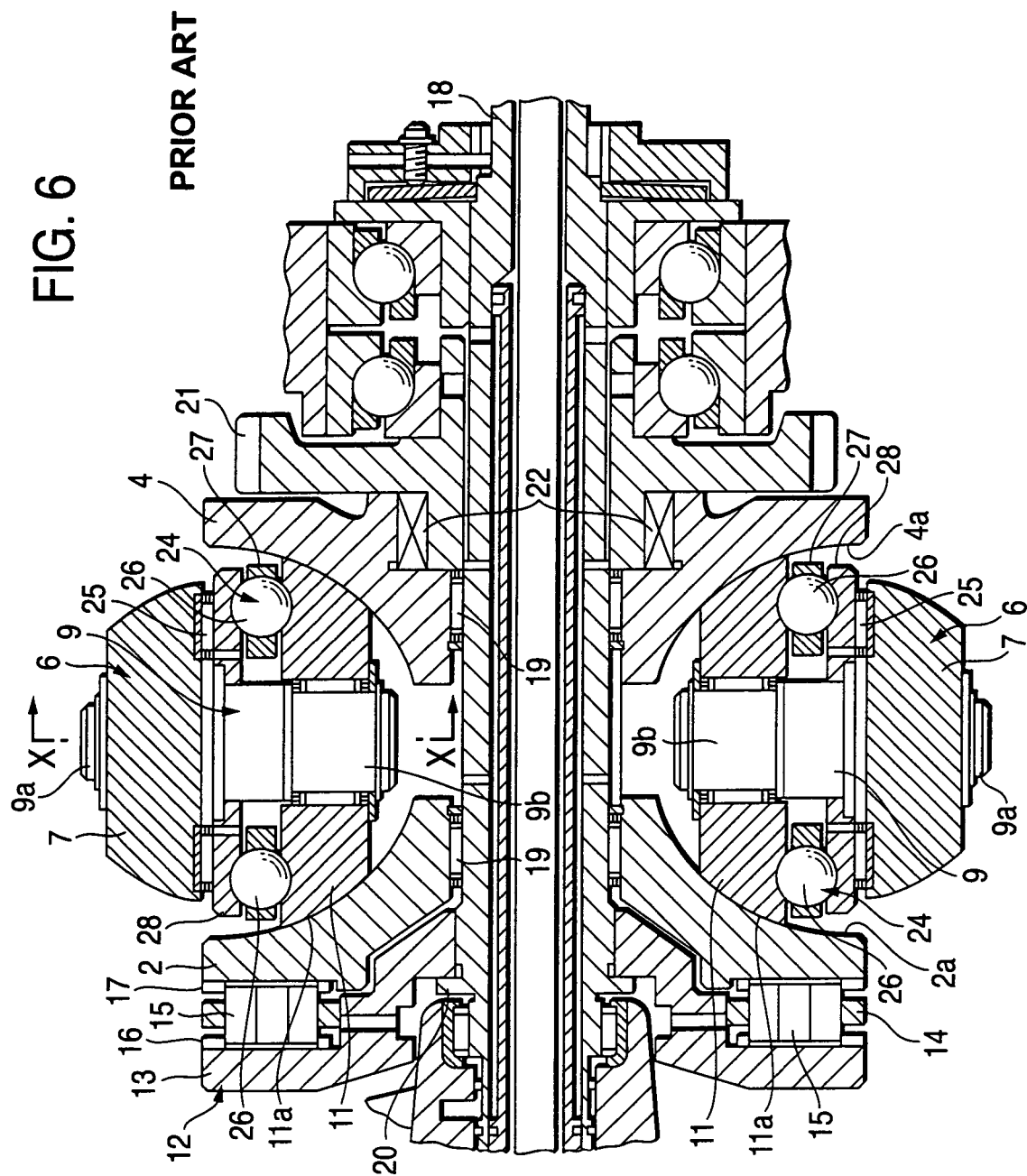
FIG. 6 is a section view of a specific example of a conventional structure; and, FIG. 7 is a section view taken along the line X—X shown in FIG. 6.
Figure 7:
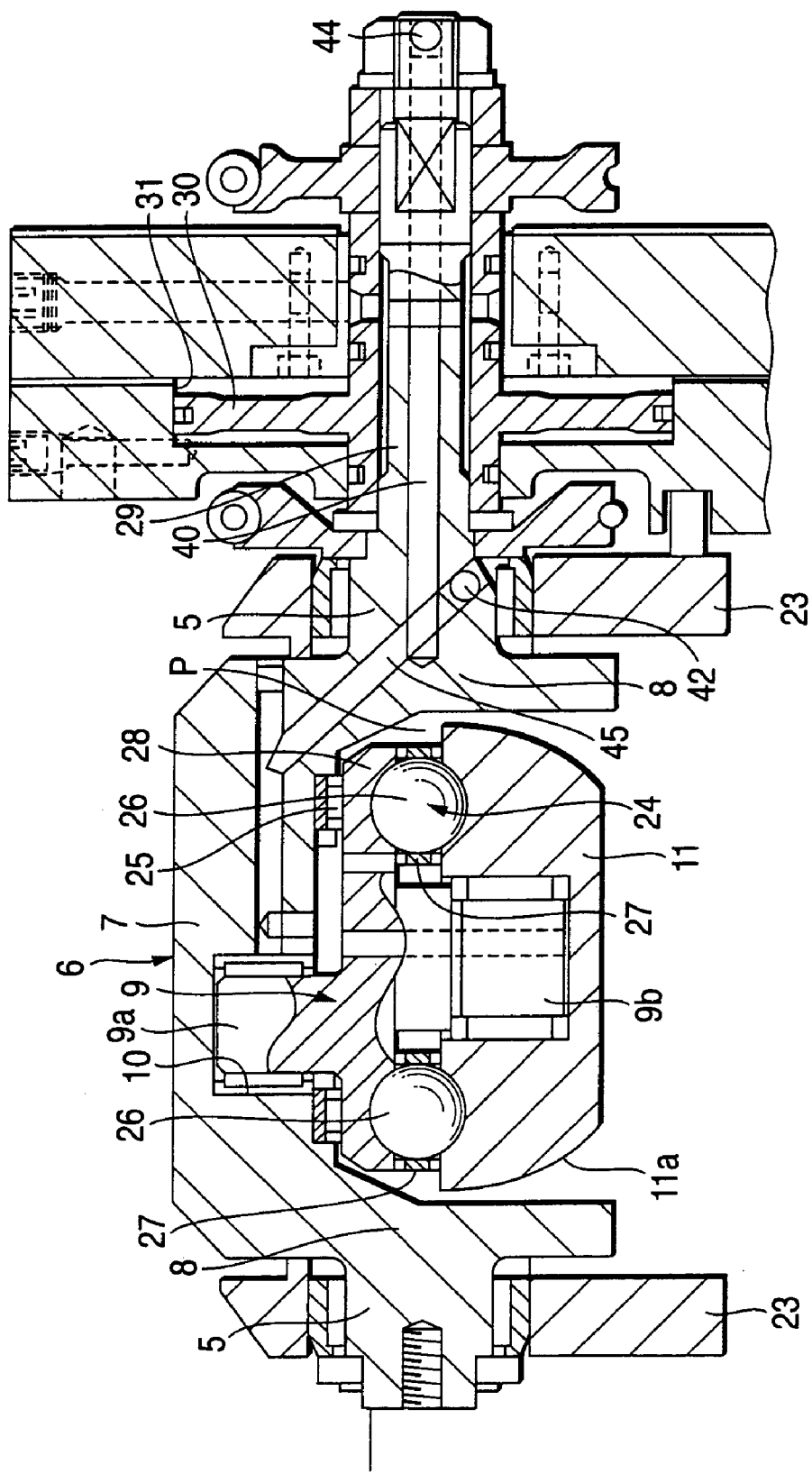

For example, the invention can also apply to all kinds of toroidal-type continuously variable transmissions in which a trunnion and a trunnion shaft are formed as an integral body, and the invention is free from the shapes of trunnions. Specifically, as shown in FIG. 3, the invention can also apply to a toroidal-type continuously variable transmission structured such that a connecting member 70, which is used to restrict the inner surface side (pocket portion P side) of the trunnion 6 from being deformed elastically in a direction where it provides a concave surface, is disposed on the inner surface side of the trunnion 6 where the power roller 11 is situated.

As has been described heretofore, according to the toroidal-type continuously variable transmission of the invention, the trunnion and trunnion shaft can be formed with high precision and the lubricating oil passage in the trunnion shaft can be formed simply, whereby the number of steps of working the trunnion and trunnion shaft can be reduced and thus the manufacturing cost thereof can be reduced.

What is claimed is:

1. A toroidal-type continuously variable transmission, comprising:

first and second disks respectively having inner surfaces and rotatably supported to be concentric with each other in such a manner the mutual inner surfaces thereof are opposed to each other;

a trunnion swingable about the associated pivot shafts situated at positions twisted with respect to the center axes of said first and second disks, said trunnion including:

a support plate portion; and a pair of bent wall portions formed in two end portions of said support plate portion and bent on an inner surface side of said support plate portion, said pivot shafts being disposed concentrically with each other on outer surfaces of said bent wall portions;

a displacement shaft supported on a central portion of said support plate portion of said trunnion in such a manner as to project out from the inner surface of said support plate portion;

a power roller rotatably supported on a periphery of said displacement shaft;

a bearing disposed on an outer surface of said power roller for allowing said power roller to rotate while supporting a thrust-direction load applied to said power roller;

a trunnion shaft formed integrally with said pivot shaft;

an oil pressure piston fitted with an outer peripheral surface of said trunnion shaft for moving said trunnions along the axial direction of said pivot shaft; and, a cut-away portion formed in the outer peripheral surface of said trunnion shaft for forming, between said cut-away portion and said oil pressure piston, an oil passage for a lubricating oil to be supplied to said bearing.

2. The toroidal-type continuously variable transmission as set forth in claim 1, wherein said cut-way portion is formed in a flat shape.

3. A toroidal-type continuously variable transmission, comprising:

first and second disks respectively having inner surfaces and rotatably supported to be concentric with each other in such a manner the mutual inner surfaces thereof are opposed to each other;

a trunnion swingable about the associated pivot shafts situated at positions twisted with respect to the center axes of said first and second disks, said trunnion including:

a support plate portion; and a pair of bent wall portions formed in two end portions of said support plate portion and bent on an inner surface side of said support plate portion, said pivot shafts being disposed concentrically with each other on outer surfaces of said bent wall portions, said support plate portion and said pair of bent wall portions cooperatively forming a pocket portion;

a displacement shaft supported on a central portion of said support plate portion of said trunnion in such a manner as to project out from the inner surface of said support plate portion;

a power roller received in said pocket portion and rotatably supported on a periphery of said displacement shaft;

a bearing disposed on an outer surface of said power roller for allowing said power roller to rotate while supporting a thrust-direction load applied to said power roller;

a trunnion shaft formed integrally with said pivot shaft;

an oil pressure piston fitted with an outer peripheral surface of said trunnion shaft for moving said trunnions along the axial direction of said pivot shaft; and, a first cut-away portion formed in the outer peripheral surface of said trunnion shaft for forming, between said first cut-away portion and said oil pressure piston, an oil passage for a lubricating oil to be supplied to said bearing.

4. The toroidal-type continuously variable transmission as set forth in claim 3, further including a second cut-away portion formed in said pivot shaft and communicating with an oil hole formed in said pivot shaft.

\* \* \* \* \*